US012580465B2

(12) United States Patent
Bartlett et al.

(10) Patent No.: US 12,580,465 B2
(45) Date of Patent: Mar. 17, 2026

(54) AXIAL FLUX SWITCHED RELUCTANCE AND INDUCTANCE STATE MACHINE SYSTEMS, DEVICES, AND METHODS

(71) Applicant: Anthropocene Institute LLC, Palo Alto, CA (US)

(72) Inventors: Scott Bartlett, San Pablo, CA (US); Martin Pena, Pinole, CA (US); Carl Page, Palo Alto, CA (US)

(73) Assignee: Anthropocene Institute LLC, Palo Alto, CA (US)

( * ) Notice: Subject to any disclaimer, the term of this patent is extended or adjusted under 35 U.S.C. 154(b) by 43 days.

(21) Appl. No.: 18/796,956

(22) Filed: Aug. 7, 2024

(65) Prior Publication Data

US 2025/0007375 A1      Jan. 2, 2025

Related U.S. Application Data

(63) Continuation of application No. 18/214,771, filed on Jun. 27, 2023, now Pat. No. 12,095,320.

(Continued)

(51) Int. Cl.
*H02K 21/24* (2006.01)
*H02K 1/2795* (2022.01)
(Continued)

(52) U.S. Cl.
CPC ........... *H02K 21/24* (2013.01); *H02K 1/2795* (2022.01); *H02K 16/04* (2013.01); *H02P 25/0805* (2016.02)

(58) Field of Classification Search
CPC ...... H02K 21/02; H02K 1/2795; H02K 16/04; H02P 9/48; H02P 27/08
(Continued)

(56) References Cited

U.S. PATENT DOCUMENTS 698,640 A    4/1902  Duncan
1,669,546 A    5/1928  Aalborg
(Continued)

FOREIGN PATENT DOCUMENTS

AU    2010295220 B2    7/2012
AU    2015309162 B2    10/2018
(Continued)

OTHER PUBLICATIONS

PCTUS2023026319 International Search Report and Written Opinion dated Sep. 27, 2023, 16 pgs.
(Continued)

*Primary Examiner* — Jose A Gonzalez Quinones
(74) *Attorney, Agent, or Firm* — Duane Morris LLP; Brad Y. Chin

(57) ABSTRACT

A state machine includes a state machine having a stator assembly arranged to generate a rotating electromagnetic field in response to a control signal. The stator assembly includes a plurality of stator poles, each of the plurality of stator poles includes a coil wound normal to an axis of rotation of a rotor assembly. The state machine also includes a rotor assembly, positioned adjacent to the stator assembly, arranged to rotate in response to the rotating electromagnetic field about the axis of rotation. A first sensor is arranged to detect an angular position of the rotor assembly and output first sensor data based on the angular position of the rotor assembly. The state machine also includes a controller including a processor, a plurality of capacitors respectively electrically connected to the plurality of stator poles, and a plurality of switches respectively electrically connected to the plurality of capacitors, and the plurality of switches are controllable by the processor.

20 Claims, 16 Drawing Sheets

Related U.S. Application Data

(60) Provisional application No. 63/355,864, filed on Jun. 27, 2022.

(51) Int. Cl.
    *H02K 16/04*     (2006.01)
    *H02P 25/08*     (2016.01)

(58) Field of Classification Search
    USPC .............................. 310/102 R, 168, 170, 180
    See application file for complete search history.

(56) References Cited

U.S. PATENT DOCUMENTS

| | | | |
|---|---|---|---|
| 2,215,792 | A | 9/1940 | Jennings |
| 2,323,905 | A | 7/1943 | Goldmark |
| 2,784,352 | A | 3/1957 | Duffing |
| 2,924,633 | A | 2/1960 | Sichling et al. |
| 3,435,267 | A | 3/1969 | Beyersdorf et al. |
| 3,603,869 | A | 9/1971 | Neuffer et al. |
| 4,283,634 | A | 8/1981 | Yannone et al. |
| 4,380,146 | A | 4/1983 | Yannone et al. |
| 4,550,280 | A | 10/1985 | Freise |
| 4,584,513 | A | 4/1986 | Freise et al. |
| 4,652,776 | A | 3/1987 | George |
| 4,687,946 | A | 8/1987 | Jones |
| 4,704,571 | A | 11/1987 | Rosenberg |
| 4,902,970 | A | 2/1990 | Suquet |
| 5,075,610 | A | 12/1991 | Harris |
| 5,214,336 | A | 5/1993 | Schmidt et al. |
| 5,905,642 | A | 5/1999 | Hammond |
| 5,925,965 | A | 7/1999 | Li et al. |
| 5,939,863 | A | 8/1999 | Miller |
| 6,064,172 | A | 5/2000 | Kuznetsov |
| 6,133,664 | A | 10/2000 | Torok et al. |
| 6,166,472 | A | 12/2000 | Pinkerton et al. |
| 6,720,684 | B2 | 4/2004 | Czimmek |
| 6,750,588 | B1 | 6/2004 | Gabrys |
| 6,768,220 | B2 | 7/2004 | Johanning |
| 6,794,776 | B1 | 9/2004 | Gabrys |
| 6,924,574 | B2 | 8/2005 | Qu et al. |
| 7,026,772 | B2 | 4/2006 | Quirion |
| 7,109,671 | B2 | 9/2006 | Bedini |
| 7,230,360 | B2 | 6/2007 | Desai et al. |
| 7,834,575 | B2 | 11/2010 | Hauenstein |
| 7,956,566 | B2 | 6/2011 | Hauenstein |
| 8,083,557 | B2 | 12/2011 | Sullivan |
| 8,508,164 | B2 | 8/2013 | Le Besnerais |
| 8,773,050 | B2 | 7/2014 | Klatt |
| 9,467,009 | B2 | 10/2016 | Vanderelli et al. |
| 9,530,609 | B2 | 12/2016 | Deuringer et al. |
| 9,553,538 | B2 | 1/2017 | Krishnamurthy et al. |
| 9,614,473 | B1 | 4/2017 | Qian |
| 9,729,016 | B1 | 8/2017 | Hunstable |
| 9,755,495 | B2 | 9/2017 | Bachmaier et al. |
| 9,806,657 | B2 | 10/2017 | Barrass |
| 9,813,006 | B2 | 11/2017 | Krishnamurthy et al. |
| 9,960,662 | B2 | 5/2018 | Krishnamurthy et al. |
| 10,063,097 | B2 | 8/2018 | Frampton et al. |
| 10,069,449 | B2 | 9/2018 | Krishnamurthy et al. |
| 10,193,485 | B2 | 1/2019 | Barrass |
| 10,254,303 | B2 | 4/2019 | Grambichler et al. |
| 10,270,379 | B2 | 4/2019 | Creary et al. |
| 10,312,782 | B2 | 6/2019 | Fahimi et al. |
| 10,411,532 | B2 | 9/2019 | Lee et al. |
| 10,461,617 | B2 | 10/2019 | Krishnamurthy et al. |
| 10,483,896 | B2 | 11/2019 | Krishnamurthy et al. |
| 10,615,730 | B2 | 4/2020 | Krishnamurthy et al. |
| 10,658,910 | B2 | 5/2020 | Krishnamurthy et al. |
| 10,707,798 | B2 | 7/2020 | Krishnamurthy et al. |
| 10,734,934 | B2 | 8/2020 | Creary et al. |
| 10,992,247 | B2 | 4/2021 | Krishnamurthy et al. |
| 11,085,450 | B2 | 8/2021 | Dahouk et al. |
| 11,165,382 | B2 | 11/2021 | Creary et al. |
| 11,214,149 | B2 | 1/2022 | Koerner |
| 11,228,260 | B2 | 1/2022 | Slater et al. |
| 11,264,932 | B2 | 3/2022 | Creary et al. |
| 11,271,509 | B2 | 3/2022 | Krishnamurthy et al. |
| 11,277,061 | B2 | 3/2022 | Krishnamurthy et al. |
| 11,342,872 | B2 | 5/2022 | Krishnamurthy et al. |
| 11,532,976 | B2 | 12/2022 | Desai et al. |
| 11,601,081 | B2 | 3/2023 | Creary et al. |
| 11,682,995 | B2 | 6/2023 | Krishnamurthy et al. |
| 2004/0263099 | A1 | 12/2004 | Maslov et al. |
| 2005/0052080 | A1 | 3/2005 | Maslov et al. |
| 2006/0097596 | A1 | 5/2006 | Desai et al. |
| 2007/0040659 | A1 | 2/2007 | Williams et al. |
| 2011/0074231 | A1 | 3/2011 | Soderberg |
| 2011/0215745 | A1 | 9/2011 | Besnerais |
| 2011/0248582 | A1 | 10/2011 | Desai et al. |
| 2013/0077757 | A1 | 3/2013 | Deuringer et al. |
| 2013/0277974 | A1 | 10/2013 | Klatt |
| 2014/0246900 | A1 | 9/2014 | Klatt |
| 2014/0314597 | A1 | 10/2014 | Allaire et al. |
| 2015/0061439 | A1 | 3/2015 | Bachmaier et al. |
| 2016/0226418 | A1 | 8/2016 | Krishnamurthy et al. |
| 2016/0285402 | A1 | 9/2016 | Barrass |
| 2016/0365780 | A1 | 12/2016 | Krishnamurthy et al. |
| 2017/0126087 | A1 | 5/2017 | Soderberg |
| 2017/0133967 | A1 | 5/2017 | Krishnamurthy et al. |
| 2017/0207692 | A1 | 7/2017 | Bachmaier et al. |
| 2018/0069500 | A1 | 3/2018 | Krishnamurthy et al. |
| 2018/0183373 | A1 | 6/2018 | Barrass |
| 2018/0191230 | A1 | 7/2018 | Krishnamurthy et al. |
| 2018/0301967 | A1 | 10/2018 | Krishnamurthy et al. |
| 2018/0337582 | A1 | 11/2018 | Perry |
| 2018/0367078 | A1 | 12/2018 | Creary et al. |
| 2019/0036472 | A1 | 1/2019 | Krishnamurthy et al. |
| 2019/0149002 | A1 | 5/2019 | Kim et al. |
| 2019/0149075 | A1 | 5/2019 | Van Den Bossche |
| 2019/0253013 | A1 | 8/2019 | Creary et al. |
| 2019/0305697 | A1 | 10/2019 | Slater |
| 2019/0337390 | A1 | 11/2019 | Koerner |
| 2020/0076344 | A1 | 3/2020 | Krishnamurthy et al. |
| 2020/0144950 | A1 | 5/2020 | Krishnamurthy et al. |
| 2020/0177042 | A1 | 6/2020 | Desai et al. |
| 2020/0212834 | A1 | 7/2020 | Mazda et al. |
| 2020/0220440 | A1 | 7/2020 | Krishnamurthy et al. |
| 2020/0235690 | A1 | 7/2020 | Krishnamurthy et al. |
| 2020/0274431 | A1 | 8/2020 | Abbott et al. |
| 2020/0350800 | A1 | 11/2020 | Hurry et al. |
| 2020/0366178 | A1 | 11/2020 | Desai et al. |
| 2020/0366229 | A1 | 11/2020 | Creary et al. |
| 2020/0366231 | A1 | 11/2020 | Krishnamurthy et al. |
| 2020/0389114 | A1 | 12/2020 | Creary et al. |
| 2021/0057973 | A1 | 2/2021 | Hunstable |
| 2021/0066983 | A1 | 3/2021 | Mcsheery |
| 2021/0159829 | A1 | 5/2021 | Jian |
| 2021/0242814 | A1 | 8/2021 | Krishnamurthy et al. |
| 2021/0260358 | A1 | 8/2021 | Korakianitis et al. |
| 2021/0358686 | A1 | 11/2021 | Raminosoa et al. |
| 2022/0006340 | A1 | 1/2022 | Hunstable |
| 2022/0040470 | A1 | 2/2022 | Alexander et al. |
| 2022/0045559 | A1 | 2/2022 | Hunstable et al. |
| 2022/0060132 | A1 | 2/2022 | Creary et al. |
| 2022/0103046 | A1 | 3/2022 | Jahshan |
| 2022/0123635 | A1 | 4/2022 | Popov et al. |
| 2022/0127943 | A1 | 4/2022 | El Tawy et al. |
| 2022/0149756 | A1 | 5/2022 | Slater et al. |
| 2022/0162933 | A1 | 5/2022 | El Tawy et al. |
| 2022/0190765 | A1 | 6/2022 | Creary et al. |
| 2022/0190766 | A1 | 6/2022 | Krishnamurthy et al. |
| 2022/0286074 | A1 | 9/2022 | Krishnamurthy et al. |
| 2023/0107792 | A1 | 4/2023 | Desai et al. |
| 2023/0163709 | A1 | 5/2023 | Bayless et al. |
| 2023/0188081 | A1 | 6/2023 | Geyer |
| 2023/0208336 | A1 | 6/2023 | Creary et al. |
| 2023/0253904 | A1 | 8/2023 | Chiba et al. |

FOREIGN PATENT DOCUMENTS

| | | | |
|---|---|---|---|
| AU | 2019253808 | A1 | 11/2019 |
| AU | 2017277293 | B2 | 10/2021 |
| CA | 2948313 | A1 | 11/2015 |

(56) References Cited

FOREIGN PATENT DOCUMENTS

| | | | | | |
|----|------------|----|---------|-----|--------------|
| CN | 101262159  | A  | 9/2008  |     |              |
| CN | 100497091  | C  | 6/2009  |     |              |
| CN | 101860302  | A  | 10/2010 |     |              |
| CN | 101523694  | B  | 12/2011 |     |              |
| CN | 102931901  | A  | 2/2013  |     |              |
| CN | 104737418  | A  | 6/2015  |     |              |
| CN | 105305683  | A  | 2/2016  |     |              |
| CN | 103339004  | B  | 6/2016  |     |              |
| CN | 105682358  | A  | 6/2016  |     |              |
| CN | 104245558  | B  | 8/2016  |     |              |
| CN | 107121564  | A  | 9/2017  |     |              |
| CN | 107402312  | A  | 11/2017 |     |              |
| CN | 104897942  | B  | 3/2018  |     |              |
| CN | 108475937  | A  | 8/2018  |     |              |
| CN | 109149810  | A  | 1/2019  |     |              |
| CN | 109217853  | A  | 1/2019  |     |              |
| CN | 109471050  | A  | 3/2019  |     |              |
| CN | 106483476  | B  | 6/2019  |     |              |
| CN | 106443521  | B  | 9/2019  |     |              |
| CN | 110247607  | A  | * 9/2019  | ........... | H02P 25/092 |
| CN | 110501697  | A  | 11/2019 |     |              |
| CN | 111835352  | A  | 10/2020 |     |              |
| CN | 113422552  | A  | 9/2021  |     |              |
| CN | 113691092  | A  | 11/2021 |     |              |
| DE | 102007042394 | A1 | 4/2009 |     |              |
| DE | 102007060005 | A1 | 6/2009 |     |              |
| DE | 102014103296 | A1 | 9/2014 |     |              |
| DE | 102013205928 | A1 | 10/2014 |    |              |
| DE | 102016110428 | A1 | 12/2016 |    |              |
| DE | 102016207996 | A1 | 11/2017 |    |              |
| DE | 112017001053 | T5 | 12/2018 |    |              |
| DE | 102018217737 | A1 | 4/2019 |     |              |
| DE | 102019107398 | A1 | 10/2019 |    |              |
| DE | 102019008752 | A1 | 6/2021 |     |              |
| EP | 0815633    | A1 | 1/1998  |     |              |
| EP | 0826105    | B1 | 3/2000  |     |              |
| EP | 1026809    | A2 | 8/2000  |     |              |
| EP | 0811529    | B1 | 12/2010 |     |              |
| EP | 2537702    | A1 | 12/2012 |     |              |
| EP | 3100342    | A1 | 12/2016 |     |              |
| EP | 3229247    | A1 | 10/2017 |     |              |
| EP | 3519008    | A1 | 8/2019  |     |              |
| EP | 2975746    | B1 | 11/2019 |     |              |
| EP | 2838180    | B1 | 1/2020  |     |              |
| EP | 3706306    | A1 | 9/2020  |     |              |
| EP | 3827852    | A1 | 6/2021  |     |              |
| EP | 3829050    | A1 | 6/2021  |     |              |
| EP | 3849073    | A1 | 7/2021  |     |              |
| FR | 2669736    | A1 | 5/1992  |     |              |
| JP | H11196543  | A  | 7/1999  |     |              |
| JP | 2000192830 | A  | * 7/2000 |    |              |
| JP | 3103354    | A  | 10/2000 |     |              |
| JP | 2002527035 | A  | 8/2002  |     |              |
| JP | 2015104187 | A  | * 6/2015 |    |              |
| JP | 2016536952 | A  | 11/2016 |     |              |
| JP | 2018067909 | A  | 4/2018  |     |              |
| JP | 2019122228 | A  | 7/2019  |     |              |
| JP | 2021141746 | A  | 9/2021  |     |              |
| KR | 102312084  | B1 | 10/2021 |     |              |
| RU | 2690666    | C1 | 6/2019  |     |              |
| TW | 504893     | B  | 10/2002 |     |              |
| TW | I574500    | B  | 3/2017  |     |              |
| WO | 9629774    | A1 | 9/1996  |     |              |
| WO | 0228536    | A1 | 4/2002  |     |              |
| WO | 02065616   | A1 | 8/2002  |     |              |
| WO | 2008140924 | A1 | 11/2008 |     |              |
| WO | 2014142999 | A1 | 9/2014  |     |              |
| WO | 2015116006 | A1 | 8/2015  |     |              |
| WO | 2015150411 | A1 | 10/2015 |     |              |
| WO | 2015168793 | A2 | 11/2015 |     |              |
| WO | 2016164818 | A1 | 10/2016 |     |              |
| WO | 2018067410 | A1 | 4/2018  |     |              |
| WO | WO-2018077788 | A1 | * 5/2018 | ........... | H02K 1/146 |
| WO | 2018209009 | A1 | 11/2018 |     |              |
| WO | 2020200762 | A1 | 10/2020 |     |              |
| WO | 2021170272 | A1 | 9/2021  |     |              |
| WO | 2022060885 | A1 | 3/2022  |     |              |

OTHER PUBLICATIONS

PCTUS2023085860 Invitation to Pay Additional Fees and Partial International Search Report dated Apr. 22, 2024, 13 pgs.

US Department of Energy Advanced Manufacturing Office, Premium Efficiency Motor Selection and Application Guide, DOE/GO-102014-4107 (2014), 136 pgs.

Wang, et al., Design and Analysis of Wireless Resolver for Wireless Switched Reluctance Motors, IEEE Trans on Indust Electronics, vol. 70, No. 3, pp. 2221-2230, DOI: 10.1109/TIE.2022.3169712 (2022).

PCTUS2023085860 International Search Report and Written Opinion dated Jul. 10, 2024, 21 pgs.

* cited by examiner

100

200
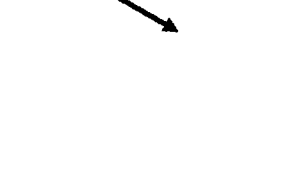
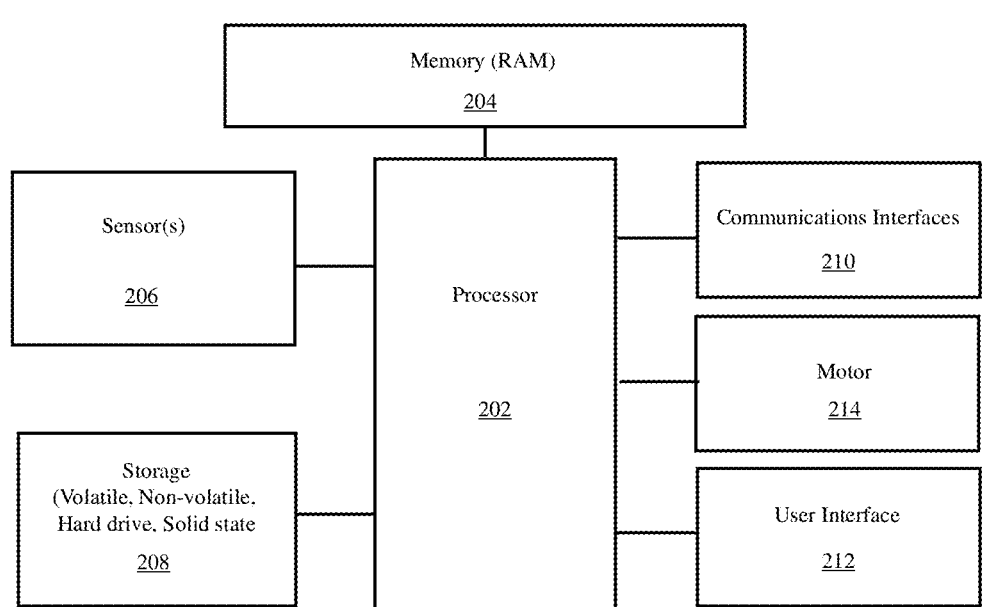
FIG. 2

600

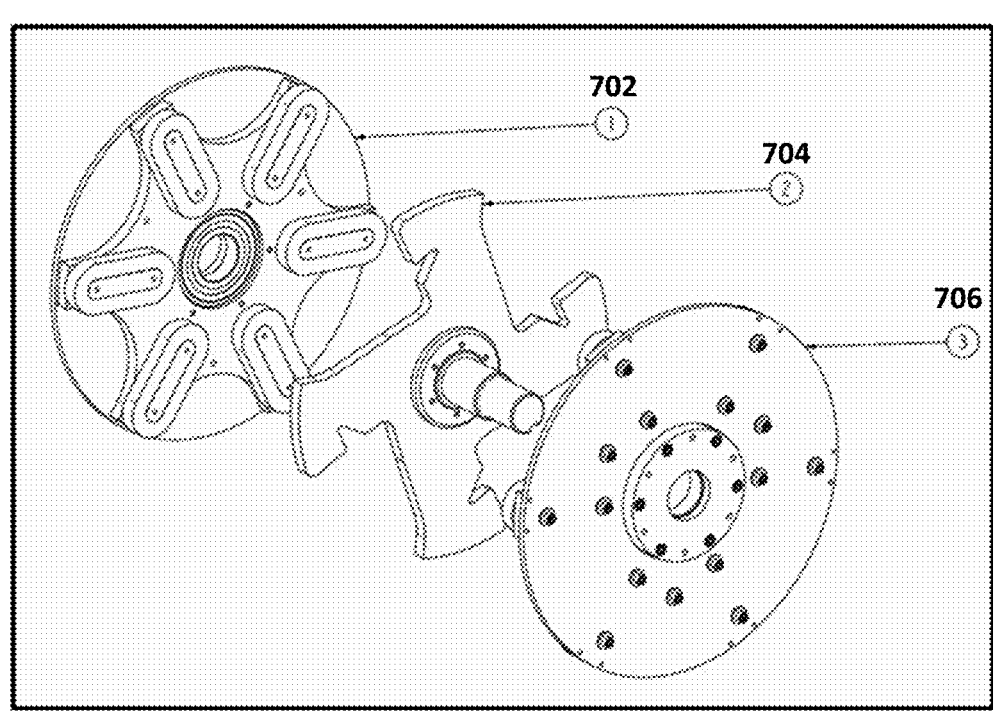
FIG. 7

800

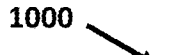
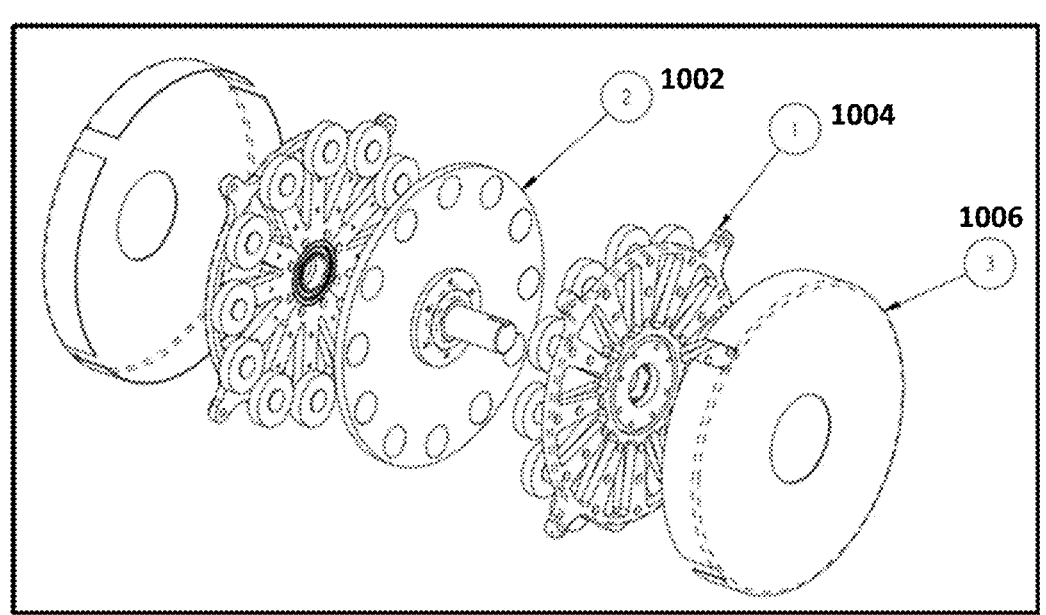
FIG. 10

1100

1102

1104

1200

1300

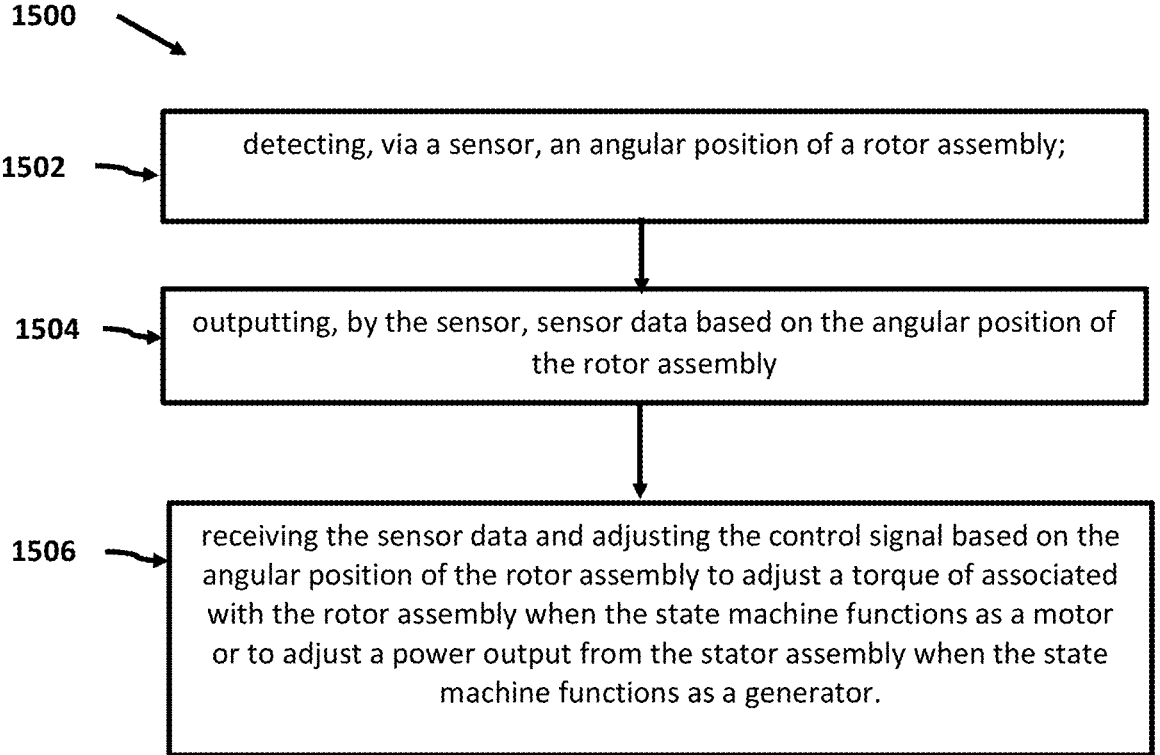

1500

1502 → detecting, via a sensor, an angular position of a rotor assembly;

1504 → outputting, by the sensor, sensor data based on the angular position of the rotor assembly 1506 → receiving the sensor data and adjusting the control signal based on the angular position of the rotor assembly to adjust a torque of associated with the rotor assembly when the state machine functions as a motor or to adjust a power output from the stator assembly when the state machine functions as a generator.

AXIAL FLUX SWITCHED RELUCTANCE AND INDUCTANCE STATE MACHINE SYSTEMS, DEVICES, AND METHODS

REFERENCE TO RELATED APPLICATIONS

This is a continuation application and claims the benefit of and priority to U.S. patent application Ser. No. 18/214,771, filed Jun. 27, 2023, entitled "Axial Flux Switched Reluctance and Inductance State Machine Systems, Devices and Methods", which claims priority to and the benefit of U.S. Provisional Patent Application No. 63/355,864, filed on Jun. 27, 2022, entitled "Axial Flux Switched Reluctance Motor Systems and Methods," the entire contents of which are incorporated herein by reference.

TECHNICAL FIELD

This application relates generally to motor or generator control techniques and, more particularly, to control of switched reluctance or inductance motors.

BACKGROUND

Numerous types of electric motors and generators are currently available for use in many commercial applications including electric vehicles (EVs), blowers, tools, pumps, fans, mixers, food processors, and power generators, among other applications. Motors typically include a stator that is fixed and rotor that rotates in relation to the stator. The rotor is connected to a drive shaft that drives operations associated with particular applications. In direct current (DC) motors, a DC current is applied to windings of the rotor to generate an electromagnetic (EM) field. While the rotor is rotated, the current applied to the rotor is commutated via mechanical brushes or via electronic control in a brushless configuration. The stator of a DC motor typically includes magnets that provide magnetic fields that interacts with the EM field generated by the rotor to affect rotation of the rotor. The stator magnets are typically made of rare Earth metals, such as neodymium and dysprosium that provide a high-density magnetic fields to facilitate relatively high torque for a DC motor.

Induction motors and reluctance motors are other types of motors. Induction motors use an alternating current (AC) or sinusoidal signal applied to the stator to generates a rotating EM field that drives rotation of an adjacent rotor. A three-phase induction motor typically has a stator with three pole pairs (i.e., six stator poles), where each pole pair includes series-connected windings that carry one of the three phases of an electrical voltage and current applied to the stator of the induction motor. Each phase of the current is offset by 120 degrees while each corresponding pole pair is physically offset by 120 degrees from each other. This physical and electrical configuration provides a rotating EM field that interacts with the rotor to drive rotation of the rotor assembly. The rotor may have a squire-cage configuration that enables current flow along the conduits of the squire-cage, resulting in the generation of an EM field that interacts with the EM field generated by the stator to, thereby, facilitate rotation of the rotor. The speed of rotation of the rotor may be controlled using various techniques such as varying the frequency of the current applied to each phase windings or varying the voltage, among other techniques. A reluctant motor is excited by a pulse which is triggered by a rotor position which is very different than an induction motor. Speed adjustment of an inductance motor is done by varying frequency of the rotating magnetic field, while speed adjustment of a reluctance motor is done by varying an input voltage applied to the stator windings. A reluctance motor operates in a similar manner as a stepper motor. The stator of a SRM has windings, but the rotor is typically made of steel shaped into salient poles (e.g., no windings or magnets). Computer control is needed to implement the drive waveforms (timing and trigger control) based on rotor position and current/voltage feedback. A SRM uses closed loop speed control by controlling parameters such as turn-on angle, turn-off angle, and a voltage pulse-width modulation (PWM) duty cycle. Depending on the configuration, speed control of an SRM can be based on varying the voltage PWM duty cycle of the input control signal to the stator windings. Because an SRM typically has a non-linear rotation characteristic, it can be extremely complex to model the speed control accurately.

Rotation of a reluctance motor is based on the principle that rotor and stator poles will move to a position where the lines of an EM field have the lower or lowest reluctance (i.e., lower EM field resistance). One type of reluctance motor is a three-phase switched reluctance motor (SRM). A SRM is self-starting because it includes three phases that are offset by 120 degrees electronically and three pole pairs that provide a physical 120 degrees offset from each other to facilitate rotation of a rotor assembly subject to the EM field generated by the stator assembly. A SRM uses an electronic controller that controls excitation of each of the phase windings to generate a rotating EM field.

Existing DC motors or generators for EVs or other applications typically use rare Earth metals that can adversely affect the environment and are becoming less available due to demand. Induction and reluctance motors can provide an alternative to DC motors to reduced the need for rare Earth metals, but typically have lower performance capabilities compared to DC motors. Accordingly, there is a need to implement motors that eliminate or reduce the use of rare Earth metals, while providing sufficient performance capabilities with respect to DC motors or AC motors using rare Earth metals.

SUMMARY

The application, in various implementations, addresses deficiencies associated with existing electric motor and generator implementations.

This application describes exemplary systems, methods, and devices that implement induction and/or reluctance motors capable of providing sufficient power and/or torque for a drive shaft to adequately operate within, for example, an EV. The exemplary induction and/or reluctance motor or generator systems, methods, and devices can provide implementations that do not use rare Earth metals while not sacrificing performance with respect to other motors using rare Earth metals, such as DC motors. Rare earth magnets and/or copper conductors can still be utilized to amplify the performance of the induction and/or reluctance motors described herein if desired. However, the motors described herein leverage reluctance and inductance to generate torque or electrical power. Furthermore, inventive electromagnets are described that are suitable for integration into electric motors which have flux characteristics comparable to rare Earth magnets. In some implementations, a magnetic circuit that includes the electromagnets utilizes low cost, readily available steel alloys. The aforementioned components may be packaged in such a way to optimize the flux path for each phase, resulting in reduced power consumption and increased torque. In various implementations, the heat generation of the electric motor is significantly improved due to the geometric construction of the electromagnets and control of electrical excitation.

In one aspect, a state machine (i.e., a motor and/or generator) includes a stator assembly arranged to generate a rotating electromagnetic field in response to a control signal. The stator assembly includes a plurality of stator poles, each of the plurality of stator poles includes a coil wound normal to an axis of rotation of a rotor assembly. The state machine also includes a rotor assembly, positioned adjacent to the stator assembly, arranged to rotate in response to the rotating electromagnetic field about the axis of rotation. A first sensor is arranged to detect an angular position of the rotor assembly and output first sensor data based on the angular position of the rotor assembly. The state machine also includes a controller including a processor, a plurality of capacitors respectively electrically connected to the plurality of stator poles, and a plurality of switches respectively electrically connected to the plurality of capacitors, and the plurality of switches are controllable by the processor. When a given switch from the plurality of switches is controlled by the processor to close, the control signal, which includes an electrical signal, is provided to a corresponding capacitor from the plurality of capacitors to store electric energy. When the given switch is controlled by the processor to open, an electrical current is discharged from the capacitor to a corresponding coil from the plurality of the stator poles. The controller is arranged to receive the first sensor data and adjust the control signal based on the angular position of the rotor assembly to adjust a speed of rotation of the rotor assembly.

In some implementations, the controller is coupled to each phase of the axial flux switched reluctance motors, and wherein, for one phase, the given switch, the corresponding capacitor, and the corresponding coil are electrically connected in series with each other.

In some implementations, a second switch from the plurality of switches, a second capacitor from the plurality of capacitors, and a second coil from the plurality of stator poles are electrically connected in series with each other, and a third switch from the plurality of switches, a third capacitor from the plurality of capacitors, and a third coil from the plurality of stator poles are electrically connected in series with each other.

The state machine may further include a second sensor arranged to detect one or more motor conditions, the one or more motor conditions including one or more of a rotor assembly speed, stator current, stator voltage, and state machine temperature, the second sensor outputting second sensor data corresponding to the one or more state machine conditions, wherein the controller is further arranged to receive the second sensor data and adjust the control signal based on the second sensor data.

In some implementations, the control signal includes at least one of a pulse-width modulated waveform-and square waveform.

The controller is further configured to adjust the speed of rotation of the rotor assembly by one of adjusting a frequency associated with the control signal and adjusting a voltage of the control signal.

In some implementations, the axial flux switched reluctance motor is a multi-phase switch reluctance motor (SRM).

The axial flux switched reluctance motor may further be configured as any one of a single stator reluctance motor, a single stator dual coil reluctance motor, an in-runner reluctance motor, an out-runner dual rotor reluctance motor, an out-runner single rotor reluctance motor, a zero gradient-flux dual motor, or a zero gradient-flux out-runner motor.

In some implementations, the rotor assembly and the stator assembly do not comprise a rare Earth magnet.

The state machine may further include an AC to DC inverter arranged to convert an AC signal to DC input signal.

The state machine may further include a power source, the power source including one or more batteries configured to store electrical energy and output stored energy as an output DC electrical signal to generate the DC input signal.

Another aspect includes a method for operating a state machine having a stator assembly arranged to generate a rotating electromagnetic field in response to a control signal and a rotor assembly, positioned adjacent to the stator assembly, arranged to rotate in response to the rotating electromagnetic field. The stator assembly includes a plurality of salient stator poles and each of the plurality of salient stator poles including a coil wound normal to an axis of rotation of the rotor assembly. A controller controlling the axial flux switched reluctance motors includes a processor, a plurality of capacitors respectively electrically connected to the plurality of stator poles, and a plurality of switches respectively electrically connected to the plurality of capacitors, and the plurality of switches are controllable by the processor. The method includes: when a given switch from the plurality of switches is controlled by the processor to close, providing the control signal, which comprises an electrical signal, to a corresponding capacitor from the plurality of capacitors to store electric energy, and when the given switch is controlled by the processor to open, discharging an electrical current from the corresponding capacitor to a corresponding coil from the plurality of the stator poles. The method further includes detecting, via a sensor, an angular position of the rotor assembly, outputting, by the sensor, sensor data based on the angular position of the rotor assembly; and receiving the sensor data and adjusting the control signal based on the angular position of the rotor assembly to adjust a speed of rotation of the rotor assembly.

Another aspect includes a method for operating a state machine having a stator assembly arranged to generate a rotating electromagnetic field in response to a control signal and a rotor assembly, positioned adjacent to the stator assembly, arranged to rotate in response to the rotating electromagnetic field, where the method includes: detecting, via a sensor, an angular position of the rotor assembly; outputting, by the sensor, sensor data based on the angular position of the rotor assembly; and receiving the sensor data and adjusting the control signal based on the angular position of the rotor assembly to adjust a torque of associated with the rotor assembly when the state machine functions as a motor or to adjust a power output from the stator assembly when the state machine functions as a generator.

In some implementations, the controller is coupled to each phase of the axial flux switched reluctance motors, and wherein, for one phase, the given switch, the corresponding capacitor, and the corresponding coil are electrically connected in series with each other.

In some implementations, a second switch from the plurality of switches, a second capacitor from the plurality of capacitors, and a second coil from the plurality of stator poles are electrically connected in series with each other, and a third switch from the plurality of switches, a third capacitor from the plurality of capacitors, and a third coil from the plurality of stator poles are electrically connected in series with each other.

In some implementations, a second switch from the plurality of switches, a second capacitor from the plurality of capacitors, and a second coil from the plurality of stator poles are electrically connected in series with each other, and a third switch from the plurality of switches, a third capacitor from the plurality of capacitors, and a third coil from the plurality of stator poles are electrically connected in series with each other.

In some implementations, the rotor assembly and the stator assembly do not comprise a rare Earth magnet.

In a further aspect, an electric vehicle (EV) includes a power storage including at least one battery, where the power storage is arranged to output stored energy as an output DC electrical signal. The EV has a state machine including a stator assembly arranged to generate a rotating electromagnetic field in response to a control signal, where the stator assembly includes a plurality of salient stator poles, each of the plurality of stator poles including a coil wound normal to an axis of rotation of a rotor assembly. The state machine further includes a rotor assembly, positioned adjacent to the stator assembly, arranged to rotate in response to the rotating electromagnetic field about the axis of rotation. A first sensor is arranged to detect an angular position of the rotor assembly and output first sensor data based on the angular position of the rotor assembly. A controller having a processor, a plurality of capacitors respectively electrically connected to the plurality of stator poles, and a plurality of switches respectively electrically connected to the plurality of capacitors, and the plurality of switches are controllable by the processor is arranged to receive the first sensor data and adjust the control signal based on the angular position of the rotor assembly to adjust a speed of rotation of the rotor assembly. When a given switch from the plurality of switches is controlled by the processor to close, the control signal, which includes an electrical signal, is provided to a corresponding capacitor from the plurality of capacitors to store electric energy in the corresponding capacitor. When the given switch is controlled by the processor to open, an electrical current is discharged from the corresponding capacitor to a corresponding coil from the plurality of the stator poles.

Any two or more of the features described in this specification, including in this summary section, may be combined to form implementations not specifically described in this specification. Furthermore, while this specification may refer to examples of systems, methods, and devices related to electric motors, such techniques also apply equally to electric generators.

The details of one or more implementations are set forth in the accompanying drawings and the following description. Other features and advantages will be apparent from the description and drawings, and from the claims.

DESCRIPTION OF THE DRAWINGS

FIG. 2 shows a diagram of a computer system implemented for use in state machine controller;

FIG. 7 shows an in-runner reluctance state machine;

FIG. 10 shows a zero gradient-flux dual stator state machine;

FIG. 15 show a process for operating a reluctance and/or inductance motor.

Like reference numerals in different figures indicate like elements.

DETAILED DESCRIPTION

The application, in various implementations, addresses deficiencies associated with existing electric motors and/or generators. This application describes exemplary systems, methods, and devices that provide sufficient power and/or torque to a drive shaft to adequately operate within, for example, an EV. The exemplary induction and/or reluctance motor and/or generator systems, methods, and devices can provide implementations that do not use rare Earth metals while not sacrificing performance with respect to other types of motors using rare Earth metals, such as DC motors. The exemplary systems and techniques described herein implement cutting-edge low-cost electric state machines in an axial flux configuration. The state machines utilize either reluctance or inductance phenomena. Both reluctance and inductance state machines can act as a motor or generator. The state machine is potentially suitable for numerous applications including, without limitation, electric vehicles, maritime transportation, aviation, climate control, blowers, wind power generation, power tools, mixers, pumps, and aquatic power generation.

Figure 1:
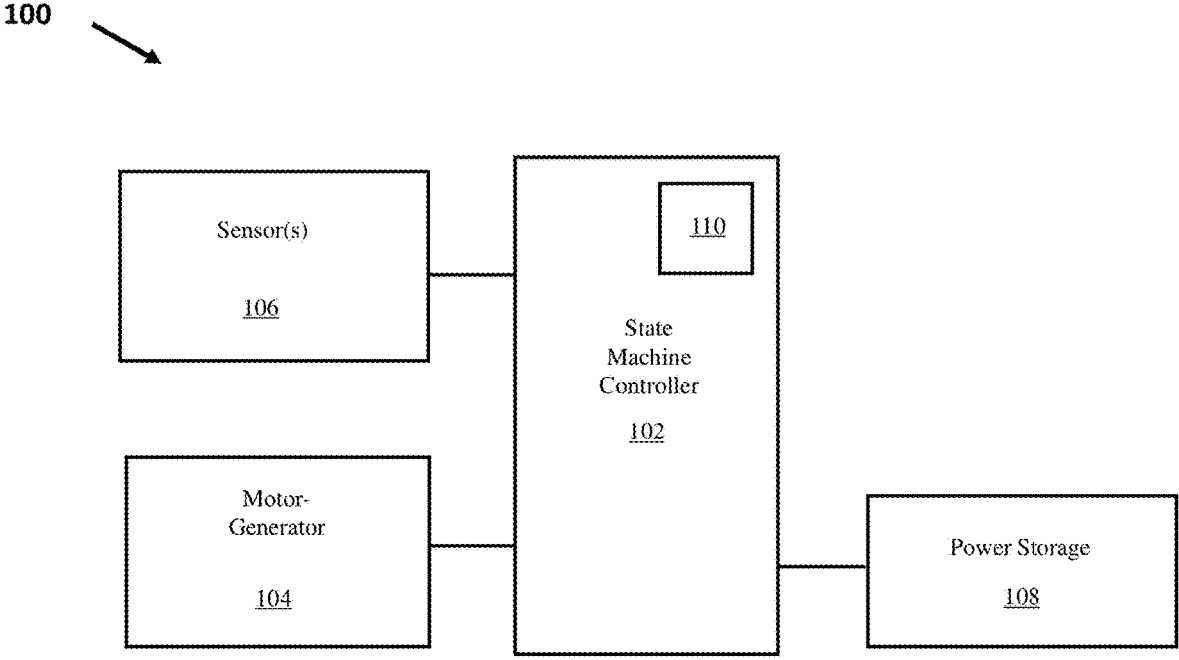
FIG. 1 is a block diagram of a state machine system.

FIG. 1 is a block diagram of a state machine system 100. The state machine system 100 includes a state machine controller 102. The controller 102 may include a processor and/or computer system 110. The system 100 may also include a power source and/or storage 108 which may, for example, include one or more batteries capable to receiving and storing electrical energy when motor-generator 104 operates as a generator or outputting torque power when motor-generator 104 operates as a motor. System 100 may include one or more sensors 106 configured to sensor one or more conditions associated with motor-generator 104 such as, without limitation, motor-generator 104 rotor assembly speed of rotation, motor-generator 104 rotor assembly angular position, motor-generator 104 temperature, motor-generator 104 output or input current, and/or motor-generator 104 voltage. Controller 102 may utilize processor 110 to receive sensor data from the one or more sensors 106 and, based on the sensor data, control one or more operations of motor-generator 104. Further details regarding processor 110 are described with respect to FIG. 2 later herein.

State machine system 100 may include a stator assembly arranged to generate a rotating electromagnetic field in response to a control signal. As previously discussed, the rotating EM field is based on a control signal including an AC signal applied to the stator windings for an induction motor. For a SRM, the rotating EM filed may be based on an excitation and/or trigger signal having, for example, a voltage PWM signal that is applied to the stator windings under the control of controller 102 based on feedback from sensors 106 is such a manner to induce rotation of the rotor assembly. System 100 may also include a rotor assembly, positioned adjacent to the stator assembly, arranged to rotate in response to the rotating electromagnetic field. In some implementations, controller 102 implements a SRM trigger control technique to affect inductance and resistance changes associated with rotor assembly position, such as for rotor assembly 504, resulting in a variable inductance time constant. Controller 102 may adjust trigger energization and de-energization for each phase to enable maximum torque and/or power output while preventing the rotor assembly 504 from aligning with an energized phase of stator assembly 502 (See FIG. 5). Depending on rotor assembly 504 speed, controller 102 can adjust a trigger to enable a desired torque and/or power output, and/or rotor assembly 504 acceleration or deceleration rate. Such a phenomenon with respect to a Heavy Side Timing & Trigger control by controller 102 may be referred to as phase trigger advance or retard.

One or more sensors 106 can be arranged to detect an angular position of the rotor assembly and output sensor data based on the angular position of the rotor assembly, among other conditions of motor-generator 104. Controller 102 can be arranged to receive the sensor data and adjust the control signal based on the angular position of the rotor assembly to adjust a torque associated with the rotor assembly when the state machine system 100 functions as a motor or to adjust a power output from the stator assembly when the state machine system 100 functions as a generator. The one or more sensors may be arranged to detect one or more additional state machine 100 conditions including, for example, a rotor assembly speed, stator current, stator voltage, and state machine temperature. Controller 102 may be configured to adjust the control signal to, thereby, adjust an operation of motor-generator 104, based on the sensor data associated with multiple detected conditions of the motor-generator 104.

System 100 and various implementations of rotor-stator configurations eliminate the need for rare Earth magnets and copper conductors in, for example, motor-generator 104. However, rare Earth magnets and/or copper conductors can still be utilized to amplify the performance of motor-generator 104. But a differentiation of motor-generator 104 with respect to conventional systems includes leveraging reluctance and inductance to generate torque or electrical power. The inventive system, devices, and methods described herein include electromagnets suitable for integration into electric motors and/or generators which have flux characteristics comparable to rare Earth magnets. A magnetic circuit which includes the inventive electromagnets utilizes low cost and readily available steel alloys such as, without limitation stainless steel, duplex stainless steel, maraging steel, carbon steel Vanadium, high-speed steel, Titanium, Forromolybdenum, HSLA steel, Alloy 20, Ferromanganese, Ferronickel, chrome steel, Chromium-vanadium steel, electrical steel, Damascus steel, AL-6XN, Spring steel Bulat steel, ANSI 4145, Microalloyed steel, and Molybdenum. The aforementioned components can be packaged in such a way to optimize the flux path for each phase resulting in reduced power consumption and increased torque. In various implementations, the heat generation of, for example, motor-generator 104 has been significantly improved due to the geometric construction of the electromagnets and the method of electrical excitation. FIGS. 5-14 show exemplary rotor-stator assembly geometric configurations related to reluctance and inductance type motor generators which will be discussed in more detail later herein.

FIG. 2 shows a diagram of a processor and/or computer system 200 that may be implemented in, for example, state machine 102. Processor system 200 could represent a processing system within a motor and/or generator controller such as described in FIG. 1, e.g., processor 110 of state machine controller 102. Processor and/or computer system 200 may include a microcontroller, a processor, a system-on-a-chip (SoC), a client device, and/or a physical computing device and may include hardware and/or virtual processor(s). In some implementations, processor system 200 and its elements as shown in FIG. 2 each relate to physical hardware and in some implementations one, more, or all of the elements could be implemented using emulators or virtual machines. Regardless, processor system 200 may be implemented on physical hardware.

As also shown in FIG. 2, processor system 200 may include a user interface 212, having, for example, a keyboard, keypad, touchpad, or sensor readout (e.g., biometric scanner) and one or more output devices, such as displays, speakers for audio, LED indicators, and/or light indicators. Processor and/or computer system 200 may also include communications interfaces 210, such as a network communication unit that could include a wired communication component and/or a wireless communications component, which may be communicatively coupled to one or more components of controller 102. The network communication unit may utilize any of a variety of proprietary or standardized network protocols, such as Ethernet, TCP/IP, to name a few of many protocols, to effect communications between processor 202 and another device, network, or system. Network communication units may also comprise one or more transceivers that utilize the Ethernet, power line communication (PLC), Wi-Fi, cellular, and/or other communication methods. Processor and/or computer system 200 may include a processing element, such as controller and/or processor 202, that contains one or more hardware processors, where each hardware processor may have a single or multiple processor cores. In one implementation, the processor 202 includes at least one shared cache that stores data (e.g., computing instructions) that are utilized by one or more other components of processor 202. For example, the shared cache may be a locally cached data stored in a memory for faster access by components of the processing elements that make up processor 202. Examples of processors include, but are not limited to a central processing unit (CPU) and/or microprocessor. Controller and/or processor 202 may utilize a computer architecture base on, without limitation, the Intel® 8051 architecture, Motorola® 68HCX, Intel® 80×86, and the like. Processor 202 may include, without limitation, an 8-bit, 12-bit, 16-bit, 32-bit, or 64-bit architecture. Although not illustrated in FIG. 2, the processing elements that make up processor 202 may also include one or more other types of hardware processing components, such as graphics processing units (GPUs), application specific integrated circuits (ASICs), field-programmable gate arrays (FPGAs), and/or digital signal processors (DSPs).

FIG. 2 illustrates that memory 204 may be operatively and communicatively coupled to processor 202. Memory 204 may be a non-transitory medium configured to store various types of data. For example, memory 204 may include one or more storage devices 208 that include a non-volatile storage device and/or volatile memory. Volatile memory, such as random-access memory (RAM), can be any suitable non-permanent storage device. The non-volatile storage devices 208 may include one or more disk drives, optical drives, solid-state drives (SSDs), tape drives, flash memory, read-only memory (ROM), and/or any other type memory designed to maintain data for a duration time after a power loss or shut down operation. In certain configurations, the non-volatile storage devices 208 may be used to store overflow data if allocated RAM is not large enough to hold all working data. The non-volatile storage devices 208 may also be used to store programs that are loaded into the RAM when such programs are selected for execution. Data store and/or storage devices 208 may be arranged to store a plurality of motor control instruction programs associated with operating a motor. Such control instruction programs may include instruction for controller and/or processor 202 to: run, adjust speed, start or stop one or motors 104 and/or 214 (e.g., a drive motor for an electric vehicle).

Persons of ordinary skill in the art are aware that software programs may be developed, encoded, and compiled in a variety of computing languages for a variety of software platforms and/or operating systems and subsequently loaded and executed by processor 202. In one implementation, the compiling process of the software program may transform program code written in a programming language to another computer language such that the processor 202 is able to execute the programming code. For example, the compiling process of the software program may generate an executable program that provides encoded instructions (e.g., machine code instructions) for processor 202 to accomplish specific, non-generic, particular computing functions.

After the compiling process, the encoded instructions may be loaded as computer executable instructions or process steps to processor 202 from storage 208, from memory 204, and/or embedded within processor 202 (e.g., via a cache or on-board ROM). Processor 202 may be configured to execute the stored instructions or process steps in order to perform instructions or process steps to transform the processor and/or computer system 200 into a non-generic, particular, specially programmed machine or apparatus. Stored data, e.g., data stored by a data store and/or storage device 208, may be accessed by processor 202 during the execution of computer executable instructions or process steps to instruct one or more components within processor system 200 and/or other components or devices external to system 200.

User interface 212 can include a display, positional input device (such as a mouse, touchpad, touchscreen, or the like), keyboard, keypad, one or more buttons, or other forms of user input and output devices. The user interface components may be communicatively coupled to processor 202. When the user interface output device is or includes a display, the display can be implemented in various ways, including by a liquid crystal display (LCD) or a cathode-ray tube (CRT) or light emitting diode (LED) display, such as an OLED display. Sensors 206 may include one or more sensors that detect and/or monitor conditions within or surrounding system 200 and/or within or surrounding a motor such as motor 104 and/or 214. Conditions may include, without limitation, rotation, speed of rotation, and/or movement of a device or component (e.g., a motor), temperature, pressure, current, position of a device or component (e.g., angular position of a rotor). Persons of ordinary skill in the art are aware that electronic processing systems, such as system 200, may include other components well known in the art, such as power sources, e.g., power source 108, and/or analog-to-digital converters, not explicitly shown in FIG. 2.

In some implementations, processor and/or computer system 200 and/or processor 202 includes an SoC having multiple hardware components, including but not limited to:

a microcontroller, microprocessor or digital signal processor (DSP) core and/or multiprocessor SoCs (MP-SoC) having more than one processor cores;

memory blocks including a selection of read-only memory (ROM), random access memory (RAM), electronically erasable programmable read-only memory (EEPROM) and flash memory;

timing sources including oscillators and phase-docked loops;

peripherals including counter-timers, real-time timers and power-on reset generators;

external interfaces, including industry standards such as universal serial bus (USB), FireWire, Ethernet, universal synchronous/asynchronous receiver/transmitter (USART), serial peripheral interface (SPI);

analog interfaces including analog-to-digital converters (ADCs) and digital-to-analog converters (DACs); and voltage regulators and power management circuits.

A SoC includes both the hardware, described above, and software controlling the microcontroller, microprocessor and/or DSP cores, peripherals and interfaces. Most SoCs are developed from pre-qualified hardware blocks for the hardware elements (e.g., referred to as modules or components which represent an IP core or IP block), together with software drivers that control their operation. The above listing of hardware elements is not exhaustive. A SoC may include protocol stacks that drive industry-standard interfaces like a universal serial bus (USB). Once the overall architecture of the SoC has been defined, individual hardware elements may be described in an abstract language called RTL which stands for register-transfer level. RTL is used to define the circuit behavior. Hardware elements are connected together in the same RTL language to create the full SoC design. In digital circuit design, RTL is a design abstraction which models a synchronous digital circuit in terms of the flow of digital signals (data) between hardware registers, and the logical operations performed on those signals. RTL abstraction is used in hardware description languages (HDLs) like Verilog and VHDL to create high-level representations of a circuit, from which lower-level representations and ultimately actual wiring can be derived. Design at the RTL level is typical practice in modern digital design. Verilog is standardized as Institute of Electrical and Electronic Engineers (IEEE) 1364 and is an HDL used to model electronic systems. Verilog is most commonly used in the design and verification of digital circuits at the RTL level of abstraction. Verilog may also be used in the verification of analog circuits and mixed-signal circuits, as well as in the design of genetic circuits. In some implementations, various components of processor system 200 are implemented on a printed circuit board (PCB).

Pulsed Heaviside Timing and Trigger Controller

The systems, methods, and devices described herein include a reluctance state machine and inductance state machine utilizing unique geometry and flux generating components. In various implementations, a state machine controller, such as controller 102, is configured and/or operates to complement and optimize the performance of a reluctance/Inductance state machine, such as state machine system 100. Reluctance/inductance state machines can generate mechanical output (torque) or electrical output (electrical power) depending on the state machine application.

Traditionally, reluctance state machines operating as a motor are notoriously difficult to control due to a phenomenon known as torque ripple. Torque ripple is the difference between maximum and minimum torque during one revolution. Torque ripple can result in vibration and audible noise during motor operation.

Pulsed Heaviside Trigger & Timing Controller, Magnetic Field Energy Storage Configuration (MFESC)

Figure 3:
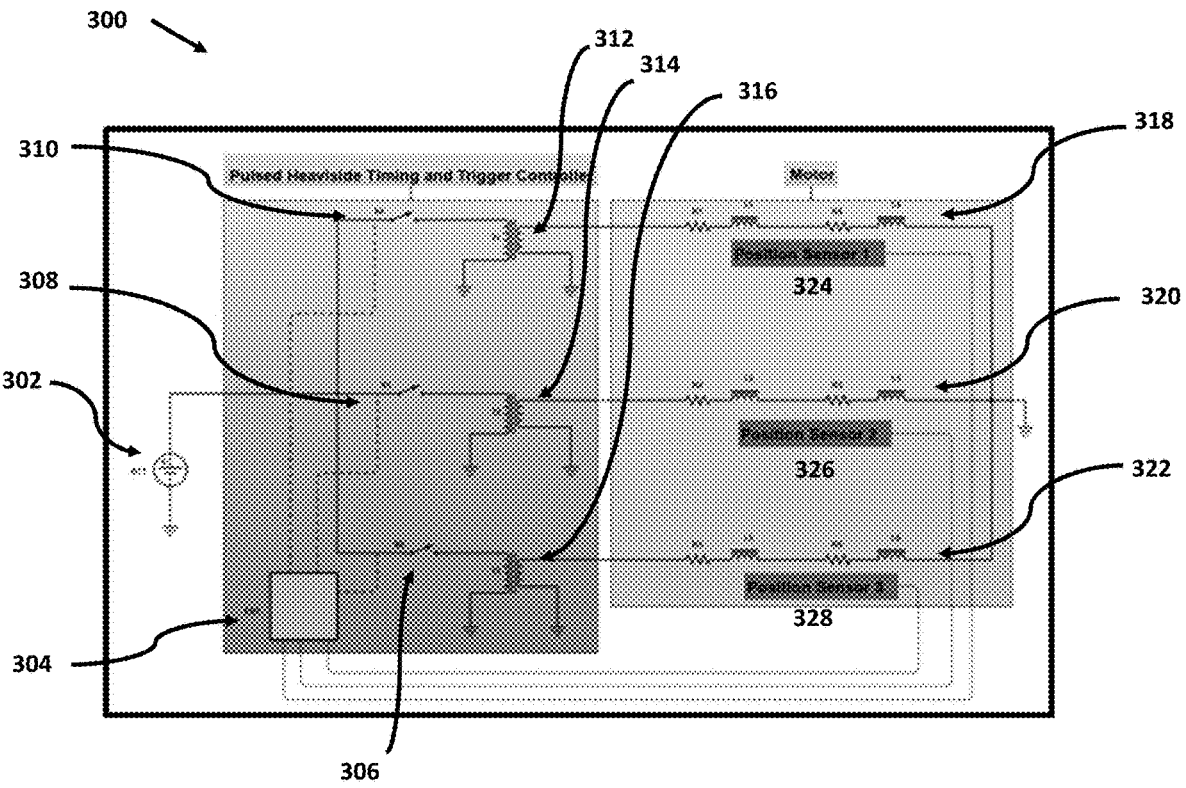
FIG. 3 shows a schematic diagram of a motor control system including inductive energy storage.

FIG. 3 shows a schematic diagram of a motor control system 300 including inductive energy storage where controller 102 and/or control system 300 operates a pulsed Heaviside Trigger & Timing Controller using MFESC to compensate for torque ripple. System 300 may be coupled to each phase of a motor stator such as stator windings 318, 320, and 322. System 300 may include sensors 324, 326, and 328 that are arranged to detect conditions of a motor such as rotor assembly speed of rotation, rotor assembly angular position, and/or motor temperature. Processor 304 and/or processor 110 may control switches 306, 308, and 310, each being in electrical communication with corresponding stator windings 318, 320, and 322 and transformers 312, 314, and 316. When a corresponding switch 306, 308, and/or 310 is closed, power source 302 provides a control signal including an electrical signal to transformer 312, 314, and 316 respectively to store magnetic energy in their primary windings. When a corresponding switch 306, 308, and/or 310 is opened, the magnetic field in transformer 312, 314, or 316 collapses and electrical current is discharged from the secondary windings to a corresponding stator winding 318, 320, and 322.

Processor 304 and/or 110 receives sensor data from sensors 324, 326, and 328 and, based on the sensor data, controls the operation of switches 312, 314, and 316 to determine when addition electrical current has to be supplied to each stator winding 318, 320, and 322. Although not shown in FIG. 3, processor 304 and/or 110 may also control aspects of a control signal from power source 302 to adjust frequency of the control signal and, thereby, adjust the speed of rotation of a rotor assembly. The operating principle of the MFESC Pulsed Heaviside Timing and Trigger Controller 300 is the storage of electrical energy in the primary coil of a step-down transformer such as in transformer 312, 314, and 316. The energy stored in the primary coil is in the form of a magnetic field. When the current to the primary coil of the step-down transformer 312, 314, or 316 is switched off by opening switch 310, 308 or 306, the magnetic field collapses inducing a large current & voltage in the secondary coil of the step-down transformer. The electrical energy induced in the secondary coil is channeled into one of the three phases of the reluctance motor via stator windings 318, 320, and 322. The release of stored magnetic energy is triggered by the angular position of the rotor that was detected via sensor 324, 326, and/or 328. When the rotor assembly reaches a predetermined angular position, the current to the primary side coil is switched off, i.e., switch 310, 308, or 310 is opened, resulting in the corresponding motor phase winding 318, 320, and 322 being energized, resulting in flux generation. This flux generation results in torque generation that drives rotation of the rotor assembly. Such a technique can reduce torque ripple by providing a boost of electrical energy at instances when the excitation drops due to the angular position of a rotor during rotation.

Pulsed Heaviside Trigger & Timing Controller, Electric Field Energy Storage Configuration (EFESC)

Figure 4:
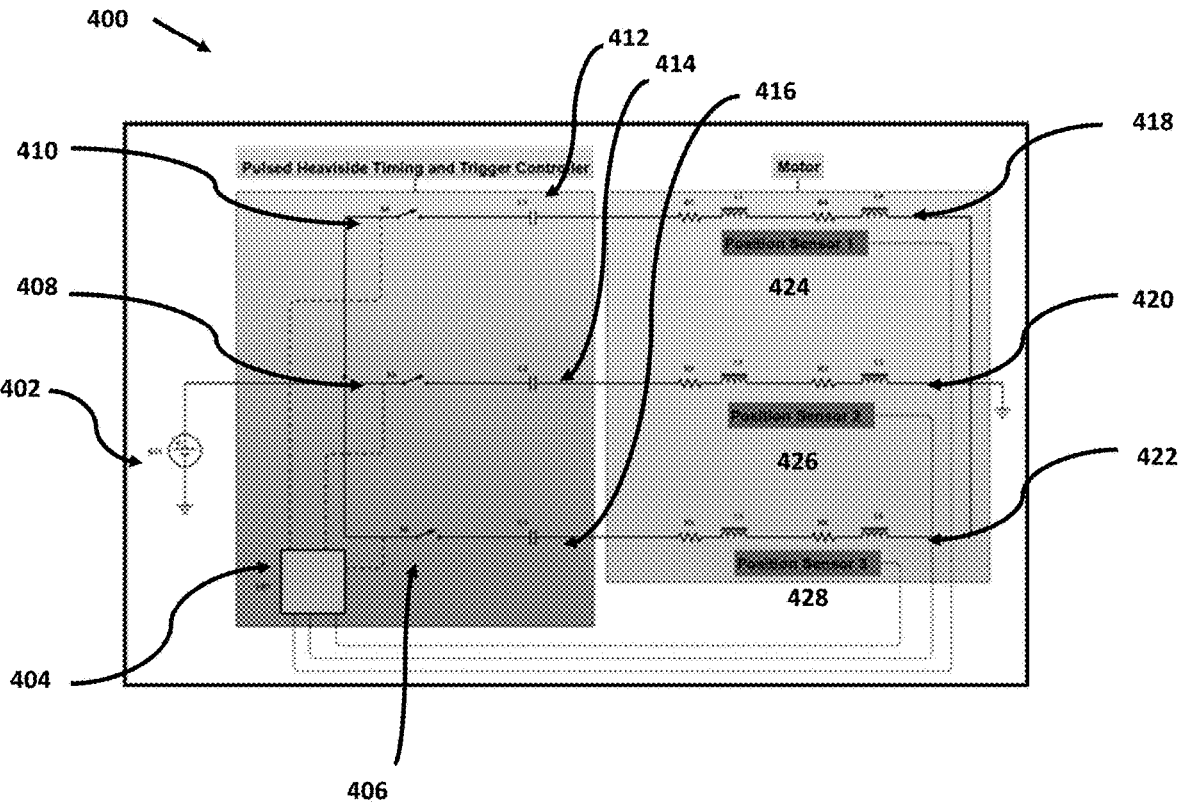
FIG. 4 shows a schematic diagram of a motor control system including electrical energy storage.

FIG. 4 shows a schematic diagram of a motor control system 400 including electrical energy storage where controller 102 and/or control system 400 operates a pulsed Heaviside Trigger & Timing Controller using EFESC to compensate for torque ripple. System 400 may be coupled to each phase of a motor stator such as stator windings 418, 420, and 422. System 400 may include sensors 424, 426, and 428 that are arranged to detect conditions of a motor such as rotor assembly speed of rotation, rotor assembly angular position, and/or motor temperature. Processor 404 and/or processor 110 may control switches 406, 408, and 410, each being in electrical communication with corresponding stator windings 418, 420, and 422 and capacitors 412, 414, and 416. The operating principle of the EFESC Pulsed Heaviside Timing and Trigger Controller 404 and/or 110 is the storage of electrical energy in a capacitor. The energy stored in the capacitor, e.g., capacitor 412, 414, and 416, is in the form of an electric field. When a capacitor, e.g., capacitor 412, is triggered a large pulse of current & voltage is channeled into one of the three phases of the reluctance motor, e.g., motor phase windings 418. The release of stored electrical energy is triggered by processor 404 and/or 110 opening switch 410 based on the angular position of the rotor. When the rotor reaches a predetermined angular position, switch 410 is opened by processor 404 and capacitor 412 is discharged resulting in the motor phase winding 418 being energized, resulting in flux generation. This flux generation results in torque generation to drive the rotor assembly. Such a technique can reduce torque ripple by providing a boost of electrical energy at instances when the excitation drops due to the angular position of a rotor during rotation.

Pulsed Heaviside Trigger & Timing Controller, Non-Sinusoidal Rotating Magnetic Field Inductance motors operate on the principle of a rotating magnetic field. As the field rotates the rotor attempts to align itself with the rotating field resulting in rotation. Typically, this is achieved utilizing a sinusoidal input for each phase with the current & voltage alternating between positive and negative values resulting in a rotating magnetic field. The present systems, devices, and methods herein include a technique for creating rotating magnetic fields using a DC input where each half phase is excited either negatively or positively resulting in a rotating magnetic field.

Pulsed Heaviside Trigger & Timing Controller, Torque Optimization Algorithm (TOA)

For a reluctance motor, a controller such as controller 102 may implement a TOA to adjust the excitation of each phase based on rotor position, rotor speed, mechanical load, and/or heat generation. The aforementioned inputs are monitored via sensors such as sensors 106 that output corresponding sensor data. Controller 102 may, based on the sensor data, generate an optimum output excitation for each phase. For an inductance motor, controller 102 implementing the TOA adjusts the rotating magnetic field by monitoring rotor speed and position resulting in torque generation.

Pulsed Heaviside Trigger & Timing Controller, Power Generation Optimization Algorithm (PGOA)

For a reluctance generator, controller 102 may implement a PGOA whereby sensors 106 detect and/or monitor rotor assembly speed and position, and controller 102, based on the sensor data from sensors 106, controls inverting the excitation circuit for each phase to allow current generation. The output power can be filtered through an external DC-DC conditioner to provide the desired DC power to an energy storage device, e.g., power storage 108. For DC power generation, an AC to DC inverter may be implemented. Mechanical inputs required to spin a reluctance generator tend to be nonlinear with significant speed variation. Controller 102, implementing the PGOA algorithm, can closely monitor internal temperatures via sensor data from a sensor 106 and then adjust power output as required to prevent over temperature of the generator. For an inductance generator, controller 102, implementing the PGOA, monitors rotor speed and position via sensor data from sensors 106, and can trigger each phase in advance of the rotor assembly position, resulting in current generation. The output power can be filtered through an external DC-DC conditioner to provide the desired DC power to an energy storage device, e.g., power storage 108. For DC power generation, an AC to DC inverter may be implemented. Mechanical inputs required to spin an inductance generator tend to be nonlinear with significant speed variation. Controller 102, implementing the PGOA algorithm, can closely monitor internal temperatures based on sensor data from sensor 106, and adjust the power output as required to prevent over temperature of the generator.

Depending on the speed of the rotor assembly, energizing of the motor phase will require timing advancement or retarding. As the rotor assembly speed increases, the electrical energy exciting the motor phase will need to increase in intensity and shorten in terms of duration by, for example, controller 102. As the rotor assembly speed decreases, the electrical energy exciting the motor phase will need to decrease in intensity and increase in terms of duration. In some implementations, controller 102 can modulate energy intensity and duration based on the requirements of the motor phase. Controlling the intensity and duration of phase excitation can also be used to balance phases and mitigate vibration and noise resulting from torque ripple.

Conventionally, this type of control strategy has been used for ignition timing in combustion engine applications for over five decades. Utilizing capacitance or inductance battery voltage is amplified many orders of magnitude to ignite combustion gasses in the cylinder at top dead center of the compression stroke. In various implementations, controller 102 can implement this type of control technique, the difference being an amplification of current instead of voltage. The amplified current is then used to generate flux in the electromagnets of a motor. The above-described motor control techniques improve motor operation by: reducing the complexity of the power timing, and control circuitry; reducing motor power consumption; improving motor thermal profile (i.e., heat generation reduction; reducing Mean Time To Repair (MTTR); and reducing Mean Down Time (MDT).

FIGS. 5-14 show exemplary rotor-stator assembly geometric configurations related to reluctance and inductance type motor generators which enable enhanced torque and power generator with or without the use of rare Earth metals.

Figure 5:
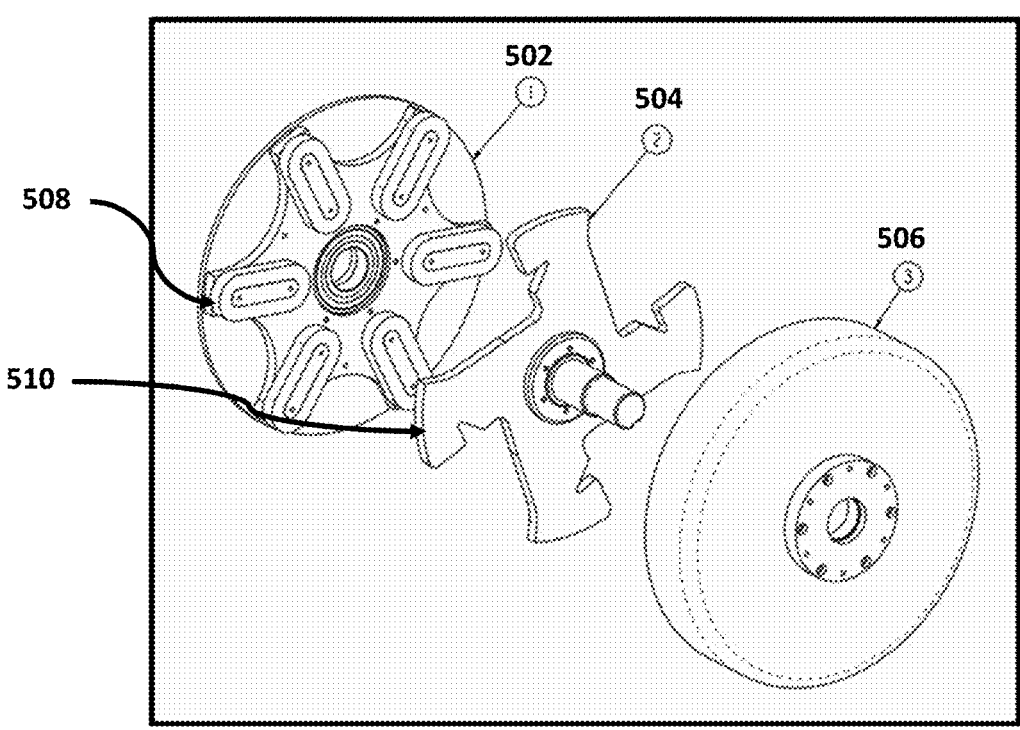
FIG. 5 shows an exploded view of a single stator reluctance state machine.

FIG. 5 shows an exploded view of a single stator reluctance state machine 500 which includes a stator assembly 502 having six motor winding poles 508 (i.e., three phase pairs), a rotor assembly 504 including four poles 510, and a cover 506.

Figure 6:
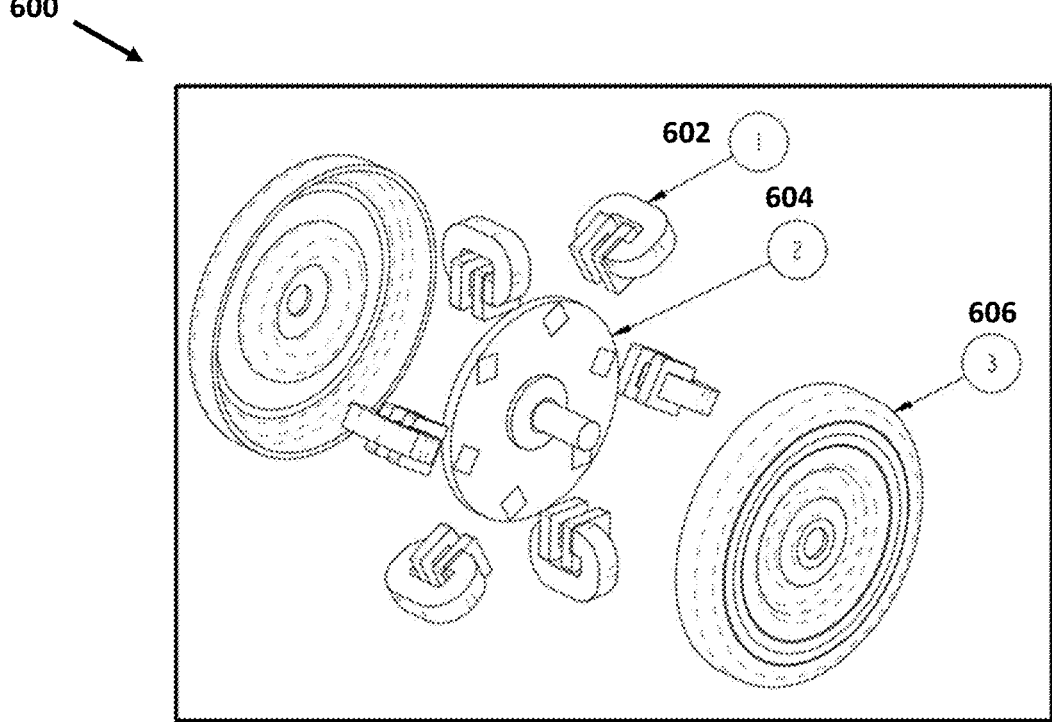
FIG. 6 shows an exploded view of a single stator dual coil reluctance state machine.

FIG. 6 shows an exploded view of a single stator dual coil reluctance state machine 600 including a rotor assembly 604 surrounded by six coil assemblies, e.g., stator poles 602, and stator support 606. The stator has six poles 602, each pole has two coils.

FIG. 7 shows an in-runner reluctance state machine 700 including rotor assembly 704 surrounded by stator assembly 702 and stator assembly 706.

Figure 8:
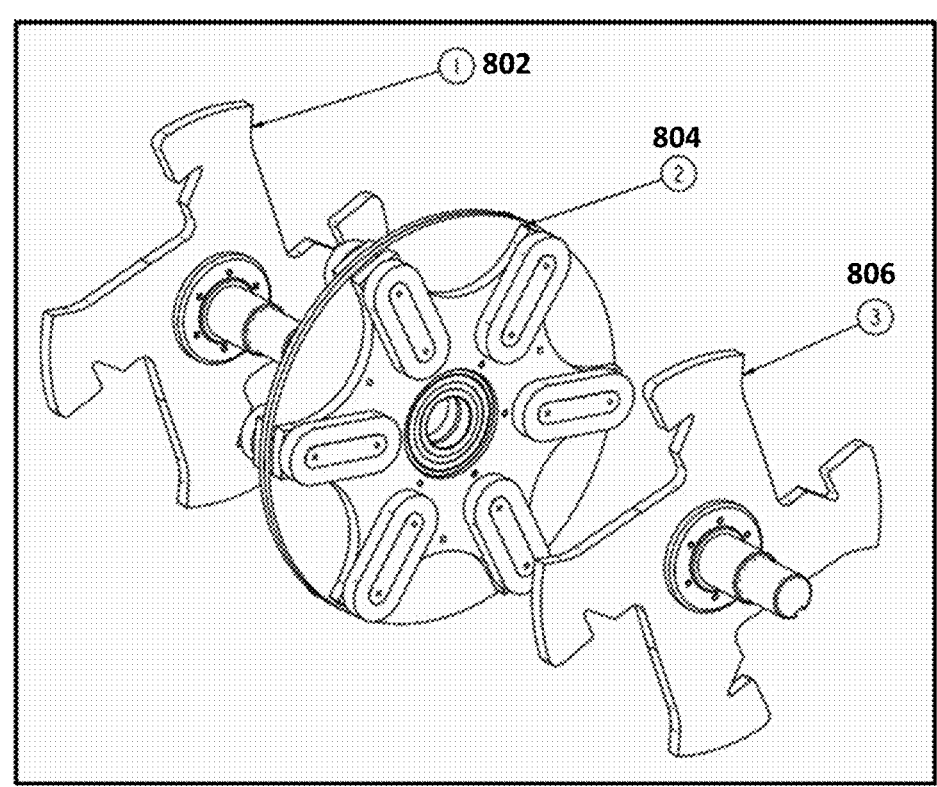
FIG. 8 shows an out-runner dual rotor reluctance state machine.

FIG. 8 shows an out-runner dual rotor reluctance state machine 800 including a stator assembly 804 surrounds on opposing sides by rotor assembly 802 and rotor assembly 806. The out-runner configuration has two outward rotors 802 and 806 connected mechanically along the axis of rotation and an omphalos stator 804.

Figure 9:
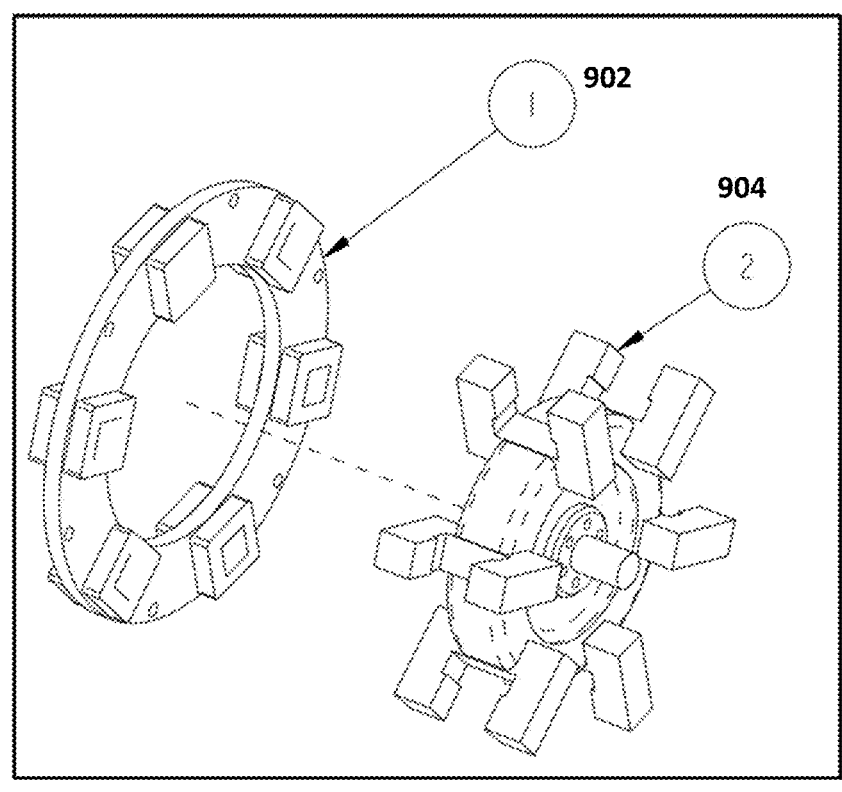
FIG. 9 shows an out-runner single rotor reluctance state machine.

FIG. 9 shows an out-runner single rotor reluctance state machine 900 including stator assembly 902 adjacent to rotor assembly 904. The out-runner configuration has two outward rotors connected mechanically along the axis of rotation and an omphalos stator 902. The stator 902 has six poles, each pole has two coils.

FIG. 10 shows a zero gradient-flux dual stator state machine 1000 including stator assembly 1004, rotor assembly 1002, and cover 1006. The in-runner configuration has two outward stators connected mechanically along the axis of rotation and an omphalos rotor 1002.

Figure 11:
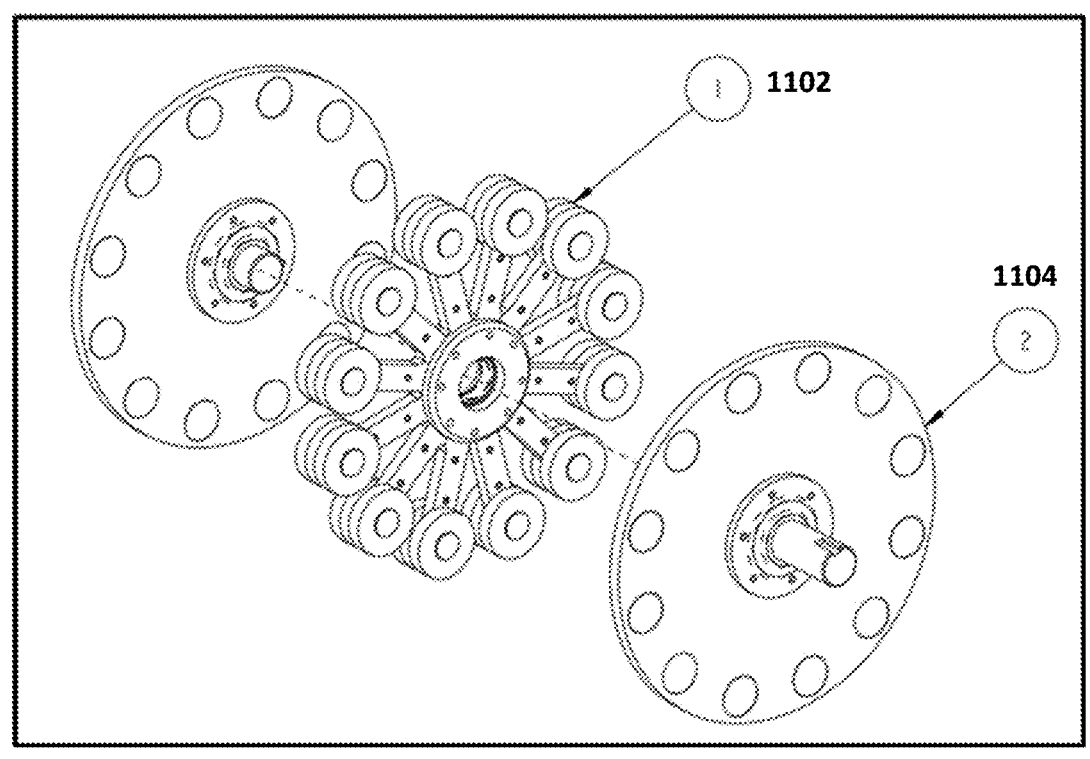
FIG. 11 shows a zero gradient-flux out runner state machine.

FIG. 11 shows a zero gradient-flux out runner state machine 1100 including stator assembly 1102 and rotor assembly 1104. The in-runner configuration has two outward rotors connected mechanically along the axis of rotation and an omphalos stator. The stator 1102 has six poles, each pole has two coils symmetric along the stator 1102 centerline.

Figure 12:
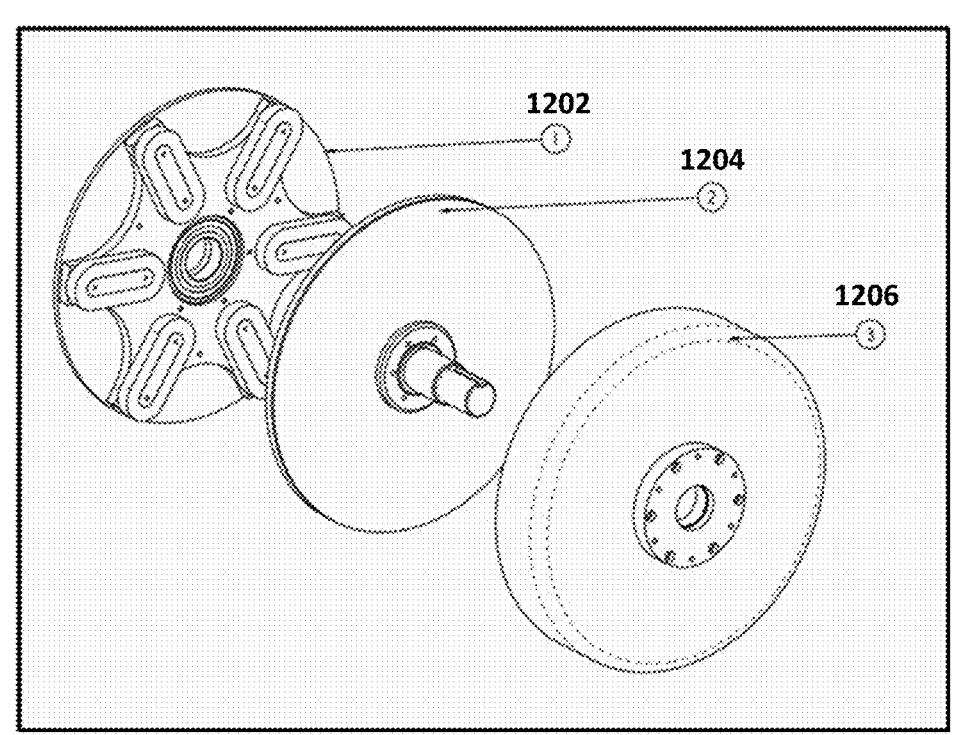
FIG. 12 shows a single stator induction state machine.

FIG. 12 shows a single stator induction state machine 1200 including stator assembly 1202, rotor assembly 1204, and cover 1206. The rotor 1204 has a inductor bar assembly encased in magnetic steel.

Figure 13:
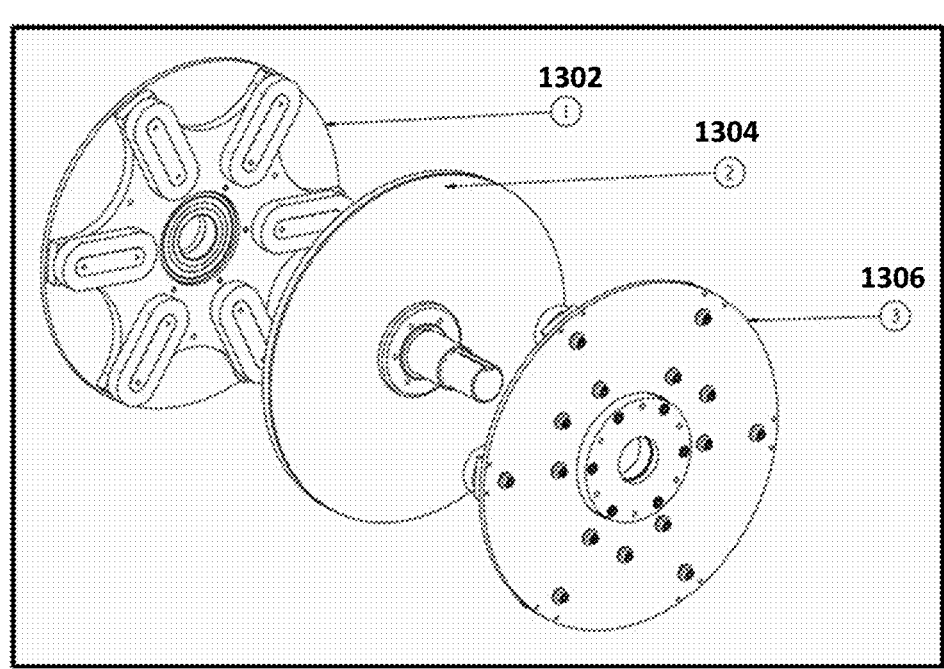
FIG. 13 shows an in-runner induction state machine.

FIG. 13 shows an in-runner induction state machine 1300 including rotor assembly 1304 surrounded on opposing sides by stator assembly 1302 and stator assembly 1306. The in-runner configuration has two outward stators 1302 and 1306, and an omphalos rotor 1304. The rotor 1304 has two electrically isolated inductor bar assemblies encased in magnetic steel.

Figure 14:
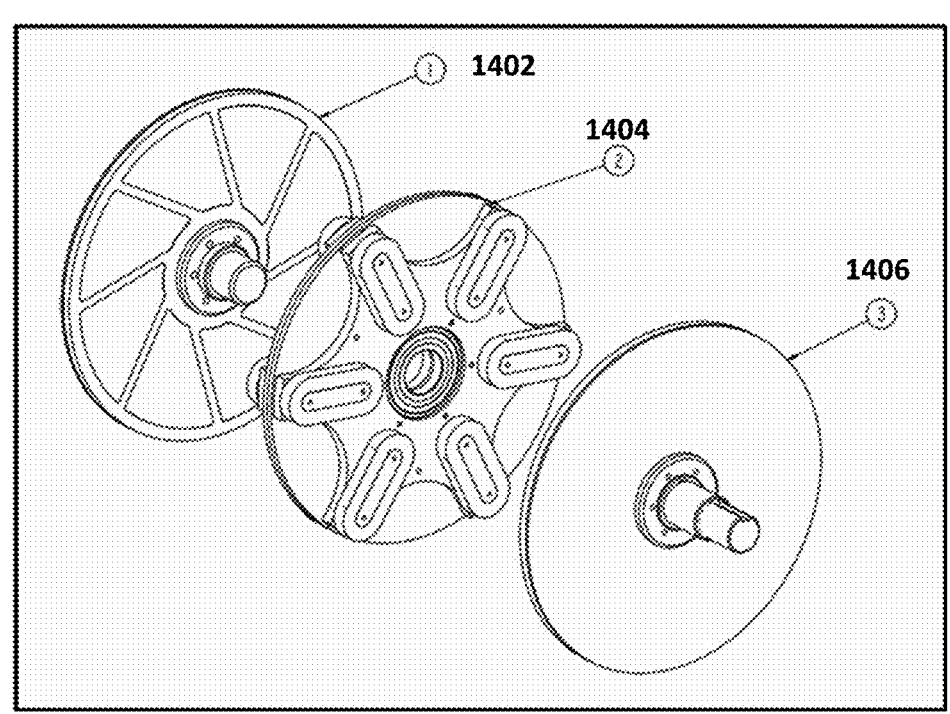
FIG. 14 shows an out-runner induction state machine.

FIG. 14 shows an out-runner induction state machine 1400 including stator assembly 1404 surrounded by rotor assembly 1402 and rotor assembly 1406. The out-runner configuration has two outward rotors 1402 and 1406 connected mechanically along the axis of rotation and an omphalos stator 1404. Each outward rotor 1402 and 1404 has a inductor bar assembly encased in magnetic steel.

FIG. 15 shows a process 1500 for operating a reluctance and/or inductance motor. Process 1500 includes detecting, via a sensor such as sensor 106, an angular position of a rotor assembly such as, for example, rotor assembly 504 or 1204 (Step 1502). Outputting, by sensor 106, sensor data based on the angular position of the rotor assembly 504 or 1204 (Step 1504). Then, receiving the sensor data by a controller such as controller 102 and adjusting a control signal based on the angular position of the rotor assembly 504 or 1204 to adjust a torque of associated with the rotor assembly 504 or 1204 when the state machine 500 or 1200 functions as a motor or to adjust a power output from the stator assembly when the state machine functions as a generator (Step 1506).

Figure 16:
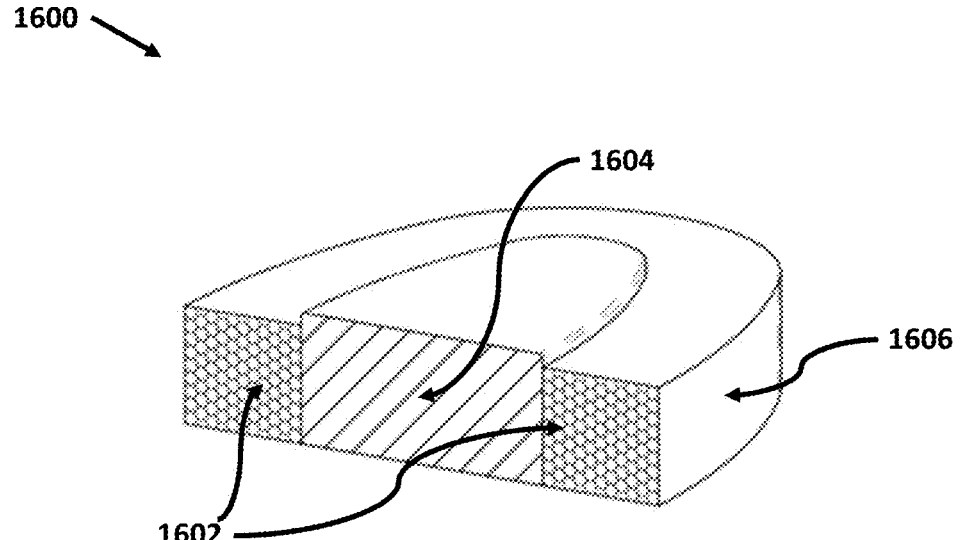
FIG. 16 is a cross-section view of an electromagnet within a reluctance state machine such as shown in FIGS. 5-14.

FIG. 16 is a cross-section view of an electromagnet 1600 within a reluctance state machine such as reluctance state machine 500 of FIG. 4. Electromagnet 1600 may be implemented within one or more poles 508 or stator assembly 502. Electromagnet 1600 may include multiple conductor loops 1602 that are wound around a metal core 1604. Core 1604 may include a metal such steel, 10×19 steel, M-19 electrical steel, and/or other magnetic core material. In various implementations, the heat generation of the electric state machine and/or motor, such as reluctance state machine 500, is significantly improved due to the geometric construction of the electromagnets 1600 and control of electrical excitation by, for example, controller 102.

Controlling heat generation resulting from motor operation is addressed in a few ways. First, vertical, and horizontal placement of every conductor loop 1602 in the coil 1606 is defined geometrically with respect to a local cartesian coordinate system. This ensures a defined and repeatable thermal characteristic for every coil 1606. Second, there are no internal air gaps between conductors 1602 within the coil 1606. This results in an internal conductive thermal path versus a mix of conductive and convective thermal paths. Thirdly, the geometry of an axially flux SRM provides a shortened direct path for heat generated to reach ambient air and be removed via convection. Additionally, windage resulting from rotor rotation, e.g., rotor assembly 504, creates a forced convection phenomena over the heat generating geometry of the coils 1606. The heated air can be evacuated from the internals of the motor, e.g., state machine 500. Finally, heat generation is controlled controller 102 using, for example, a Heavyside Timing & Trigger program and/or function. Heat generation within an electric motor, e.g., state machine 500, is a form of input energy not used for torque/power generation, otherwise known as motor inefficiency. The Heavyside Timing & Trigger control algorithm and/or program run by controller 102 closely monitors heat generation resulting from motor operation. Except for the case of intermediary conditions where maximum torque/power generation is requested by the operator, heat generation has an upper boundary set by controller 102. In some implementations, controller 102 adjusts a motor control signal based on the angular position of the rotor assembly and detected temperature of the motor to adjust a torque of associated with the rotor assembly, e.g., rotor assembly 504, to prevent the temperature of the motor from exceeding an upper temperature boundary and/or limit. The upper temperature boundary and/or limit may be preset within memory and controller 102 may compare sensed motor temperature with the stored temperature limit to determine how close the motor temperature is to the limit, and adjust the motor control signal accordingly to prevent an overtemperature condition.

Elements or steps of different implementations described may be combined to form other implementations not specifically set forth previously. Elements or steps may be left out of the systems or processes described previously without adversely affecting their operation or the operation of the system in general. Furthermore, various separate elements or steps may be combined into one or more individual elements or steps to perform the functions described in this specification.

Other implementations not specifically described in this specification are also within the scope of the following claims.

What is claimed is:

1. An axial flux switched reluctance motor comprising:
   a stator assembly arranged to generate a rotating electromagnetic field in response to a control signal, wherein the stator assembly includes a plurality of stator poles, each of the plurality of stator poles including a coil wound normal to an axis of rotation of a rotor assembly;
   the rotor assembly, positioned adjacent to the stator assembly, arranged to rotate in response to the rotating electromagnetic field about the axis of rotation;
   a first sensor arranged to detect an angular position of the rotor assembly and output first sensor data based on the angular position of the rotor assembly; and
   a controller comprising a processor, a plurality of capacitors respectively electrically connected to the plurality of stator poles, and a plurality of switches respectively electrically connected to the plurality of capacitors, and the plurality of switches are controllable by the processor;

wherein, when a given switch from the plurality of switches is controlled by the processor to close, the control signal, which comprises an electrical signal, is provided to a corresponding capacitor from the plurality of capacitors to store electric energy, and
   when the given switch is controlled by the processor to open, an electrical current is discharged from the capacitor to a corresponding coil from the plurality of the stator poles; and
   wherein the controller is arranged to receive the first sensor data and to adjust the control signal based on the angular position of the rotor assembly to adjust a speed of rotation of the rotor assembly.

2. The axial flux switched reluctance motor of claim 1, wherein the controller is coupled to each phase of the axial flux switched reluctance motors, and wherein, for one phase, the given switch, the corresponding capacitor, and the corresponding coil are electrically connected in series with each other.

3. The axial flux switched reluctance motor of claim 2, wherein a second switch from the plurality of switches, a second capacitor from the plurality of capacitors, and a second coil from the plurality of stator poles are electrically connected in series with each other; and
   wherein a third switch from the plurality of switches, a third capacitor from the plurality of capacitors, and a third coil from the plurality of stator poles are electrically connected in series with each other.

4. The axial flux switched reluctance motor of claim 1 comprising a second sensor arranged to detect one or more motor conditions, the one or more motor conditions including one or more of a rotor assembly speed, stator current, stator voltage, and state machine temperature, the second sensor outputting second sensor data corresponding to the one or more state machine conditions, wherein the controller is further arranged to receive the second sensor data and adjust the control signal based on the second sensor data.

5. The axial flux switched reluctance motor of claim 1, wherein the control signal includes at least one of a pulse-width modulated waveform-and square waveform.

6. The axial flux switched reluctance motor of claim 1, wherein the controller adjusts the speed of rotation of the rotor assembly by one of adjusting a frequency associated with the control signal and adjusting a voltage of the control signal.

7. The axial flux switched reluctance motor of claim 1, wherein the axial flux switched reluctance motor is a multi-phase switch reluctance motor (SRM).

8. The axial flux switched reluctance motor of claim 7, wherein the axial flux switched reluctance motor is configured as any one of a single stator reluctance motor, a single stator dual coil reluctance motor, an in-runner reluctance motor, an out-runner dual rotor reluctance motor, an out-runner single rotor reluctance motor, a zero gradient-flux dual motor, or a zero gradient-flux out-runner motor.

9. The axial flux switched reluctance motor of claim 1, wherein the motor is configured to operate as a motor-generator.

10. The axial flux switched reluctance motor of claim 1, wherein the rotor assembly and the stator assembly do not comprise a rare Earth magnet.

11. The axial flux switched reluctance motor of claim 1, further comprising an AC to DC inverter arranged to convert an AC signal to DC input signal.

12. The axial flux switched reluctance motor of claim 11, comprising a power source, the power source including one or more batteries configured to store electrical energy and output stored energy as an output DC electrical signal to generate the DC input signal.

13. A method for operating an axial flux switched reluctance motor including a stator assembly arranged to generate a rotating electromagnetic field in response to a control signal and a rotor assembly, positioned adjacent to the stator assembly, arranged to rotate in response to the rotating electromagnetic field, the stator assembly including a plurality of salient stator poles and each of the plurality of salient stator poles comprising a coil wound normal to an axis of rotation of the rotor assembly, wherein a controller that controls the axial flux switched reluctance motors comprises a processor, a plurality of capacitors respectively electrically connected to the plurality of stator poles, and a plurality of switches respectively electrically connected to the plurality of capacitors, and the plurality of switches are controllable by the processor; and the method comprising:

when a given switch from the plurality of switches is controlled by the processor to close, providing the control signal, which comprises an electrical signal, to a corresponding capacitor from the plurality of capacitors to store electric energy;

when the given switch is controlled by the processor to open, discharging an electrical current from the corresponding capacitor to a corresponding coil from the plurality of the stator poles;

detecting, via a sensor, an angular position of the rotor assembly;

outputting, by the sensor, sensor data based on the angular position of the rotor assembly; and receiving the sensor data and adjusting the control signal based on the angular position of the rotor assembly to adjust a speed of rotation of the rotor assembly.

14. The method of claim 13, wherein the controller is coupled to each phase of the axial flux switched reluctance motors, and wherein, for one phase, the given switch, the corresponding capacitor, and the corresponding coil are electrically connected in series with each other.

15. The method of claim 14, wherein a second switch from the plurality of switches, a second capacitor from the plurality of capacitors, and a second coil from the plurality of stator poles are electrically connected in series with each other; and wherein a third switch from the plurality of switches, a third capacitor from the plurality of capacitors, and a third coil from the plurality of stator poles are electrically connected in series with each other.

16. The method of claim 13, wherein the rotor assembly and the stator assembly do not comprise a rare Earth magnet.

17. An electric vehicle comprising:

a power storage including at least one battery, the power storage arranged to output stored energy as an output DC electrical signal; and an axial flux switched reluctance motor including:

a stator assembly arranged to generate a rotating electromagnetic field in response to a control signal, wherein the stator assembly includes a plurality of salient stator poles, each of the plurality of stator poles including a coil wound normal to an axis of rotation of a rotor assembly;

the rotor assembly, positioned adjacent to the stator assembly, arranged to rotate in response to the rotating electromagnetic field about the axis of rotation;

a first sensor arranged to detect an angular position of the rotor assembly and output first sensor data based on the angular position of the rotor assembly; and a controller comprising a processor, a plurality of capacitors respectively electrically connected to the plurality of stator poles, and a plurality of switches respectively electrically connected to the plurality of capacitors, and the plurality of switches are controllable by the processor;

wherein, when a given switch from the plurality of switches is controlled by the processor to close, the control signal, which comprises an electrical signal, is provided to a corresponding capacitor from the plurality of capacitors to store electric energy in the corresponding capacitor, when the given switch is controlled by the processor to open, an electrical current is discharged from the corresponding capacitor to a corresponding coil from the plurality of the stator poles, and wherein the controller is arranged to receive the first sensor data and adjust the control signal based on the angular position of the rotor assembly to adjust a speed of rotation of the rotor assembly.

18. The electric vehicle of claim 17, wherein the controller is coupled to each phase of the axial flux switched reluctance motors, and wherein, for one phase, the given switch, the corresponding capacitor, and the corresponding coil are electrically connected in series with each other.

19. The electric vehicle of claim 18, wherein a second switch from the plurality of switches, a second capacitor from the plurality of capacitors, and a second coil from the plurality of stator poles are electrically connected in series with each other; and wherein a third switch from the plurality of switches, a third capacitor from the plurality of capacitors, and a third coil from the plurality of stator poles are electrically connected in series with each other.

20. The electric vehicle of claim 17, wherein the rotor assembly and the stator assembly do not comprise a rare Earth magnet.

\* \* \* \* \*